No. 757,539. PATENTED APR. 19, 1904.
O. C. BABCOCK.
PLOW.
APPLICATION FILED MAR. 19, 1903.
NO MODEL.
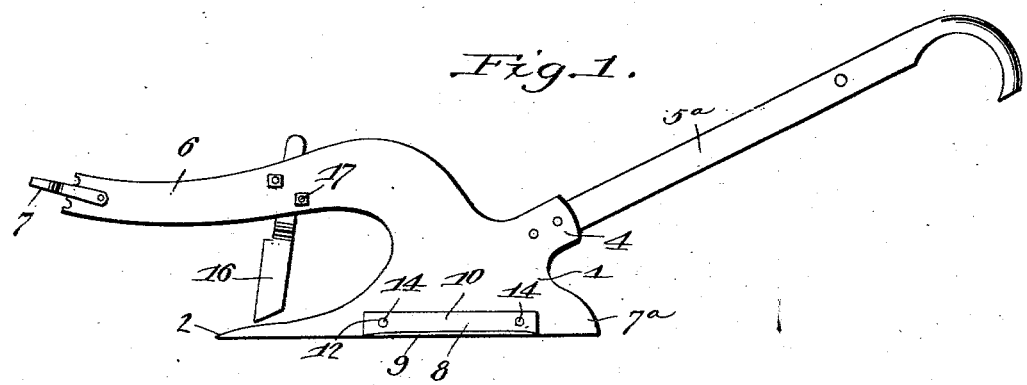
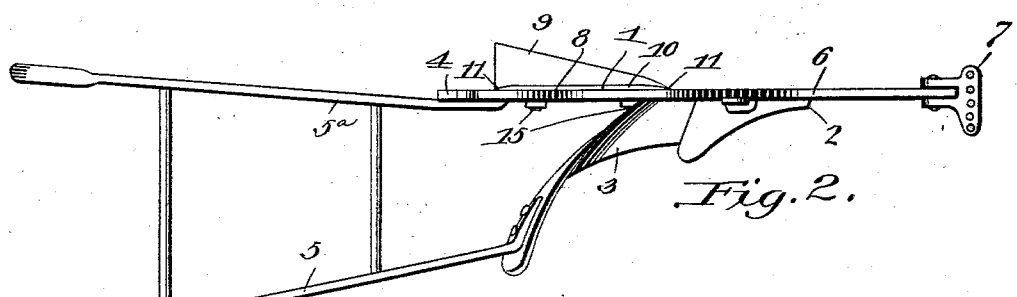
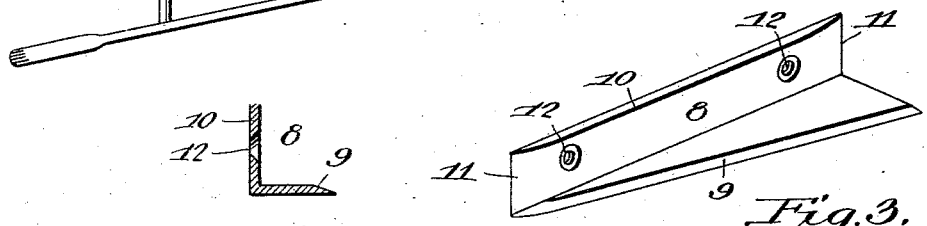
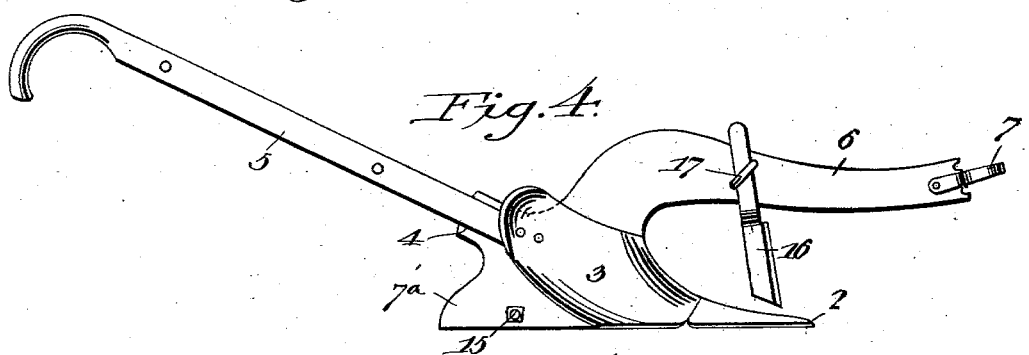
Witnesses
O. C. Babcock, Inventor,
Attorneys No. 757,539. Patented April 19, 1904.

UNITED STATES PATENT OFFICE.

ORVILL C. BABCOCK, OF SAGINAW, MICHIGAN.

PLOW.

SPECIFICATION forming part of Letters Patent No. 757,539, dated April 19, 1904.

Application filed March 19, 1903. Serial No. 148,580. (No model.)

*To all whom it may concern:*

Be it known that I, ORVILL C. BABCOCK, a citizen of the United States, residing at Saginaw, in the county of Saginaw and State of Michigan, have invented a new and useful Plow, of which the following is a specification.

This invention relates to plows; and it has for its object to provide a cutter or subsoiler to be used in connection with an ordinary plow which may be easily attached to the landside of an ordinary plow in such a manner as to leave no injurious or defacing marks when it has been used, which may be manufactured easily and at small expense, and which shall possess superior advantages in point of simplicity, durability, and general efficiency.

With these and other objects in view the invention consists in the improved construction, arrangement, and combination of parts, which will be hereinafter fully described, and particularly pointed out in the claims.

In the accompanying drawings, Figure 1 is a side elevation of a plow equipped with my improved cutter or landside. Fig. 2 is a top plan view of the same. Fig. 3 is a perspective view showing the cutter detached from the plow. Fig. 4 is a side elevation of a plow, showing the side opposite to that seen in Fig. 2. Fig. 5 is a transverse sectional view of the cutter.

1 designates the landside, 2 the point, and 3 the moldboard, of a plow. The landside is provided with a rearwardly-extending bracket 4.

5 and $5^a$ are the handles, which are bolted or otherwise securely attached, respectively, to the upper rear side of the moldboard and to the inner side of the bracket 4, said handles being of the ordinary construction. The beam 6 extends forward from the landside and is provided with a clevis 7 for the attachment of the draft. The landside is also provided with a heel $7^a$, extending rearwardly from its lower edge below the rearwardly-extending bracket 4.

8 designates my improved cutter or subsoiler attachment, which comprises a blade 9, the dimensions of which are about twelve inches in length by four inches in width at its extreme rear end, which is the widest, the said blade being wedge shape, as shown. The outer long sloping edge of this blade is carefully sharpened to enable it to cut under the soil with the least possible resistance, this result being also assisted by the peculiar formation of the blade. The latter is provided at its inner edge with a vertical flange 10, the front and rear edges of which are beveled, as indicated at 11, so as to lie closely against the part of the landside to which the device is attached. The flange 10 is preferably provided with countersunk perforations 12 to receive the heads of bolts 14, which fit snugly in the countersinks of said perforations and which extend through alining perforations in the landside near the lower edge of the latter, the fastening ends 15 being mounted upon the inner ends of the bolts and tightened up against the inner side of the landside. It is obvious that the subsoiling or cutting attachment is connected with the landside in such a position that the cutting-blade 9 shall be in horizontal alinement with the lower edge of the landside. It will also be seen that in the example shown in the drawings the cutter is attached directly in front of the rearwardly-projecting heel end $7^a$ of the landside, which in operation serves to assist in preventing the plow from swerving from its course.

16 designates a colter of ordinary construction which is connected with the plow-beam 6 by means of a clip or clamp 17.

From the foregoing description, taken in connection with the drawings hereto annexed, the operation and advantages of this device will be readily understood. It will be readily seen that my improved cutting or subsoiling attachment may be connected with or attached to any plow having a landside by simply perforating the latter at the proper points to receive the attaching-bolts. When the cutter is thus attached in position for operation, it will be seen that it presents the least possible resistance to the progress of the plow. At the same time it cuts under the sod for a distance equal to its extreme width, which, as above stated, may be about four inches, the dimensions given being for an ordinary twelve-inch plow. It follows that in breaking land, especially turf or sod land, the subsoiler cutting under the sod to the extent of its width enables the plow to turn a slice equal to its own width plus the width of the cutter, the plow being set to engage the land at a distance of its own width plus the width of the cutter from the furrow. Thus a slice of increased width may be turned with practically no additional expenditure of power, enabling a given area of land to be plowed in much less time than by means of a plow unprovided with my improved attachment. When land is to be plowed that is not adapted to be operated upon by the subsoiling attachment, the latter may be readily removed and the plow is then in its ordinary condition.

My improved cutting or subsoiling attachment is, as will be seen from the foregoing description, extremely simple and inexpensive and easily applied to an ordinary plow, the value of which will be greatly increased by the addition of my improved attachment.

Having thus described my invention, I claim—

1. In a plow, a landside comprising a smooth vertically-disposed plate extended forwardly to form an entire beam for the attachment of draft, said plate being provided with a rearwardly and upwardly-extending bracket for the attachment of one handle and with a rearwardly-extending heel.

2. In a plow, the combination with a single plate constituting a landside having a forwardly-extending beam and a rearwardly-extending heel, of the herein-described subsoiling attachment comprising an elongated, sharpened, wedge-shaped plate having an upstanding flange beveled at its front and rear ends and secured detachably to the landside with the cutter-blade in horizontal alinement with the lower edge of the latter, the upstanding flange being secured to said landside with its beveled ends in intimate contact with the latter, said ends or terminals being confined within the limits of the landside.

In testimony that I claim the foregoing as my own I have hereto affixed my signature in the presence of two witnesses.

ORVILL C. BABCOCK.

Witnesses:
E. P. WHALEY,
P. F. DEVEAUX.